United States Patent
Park et al.

(10) Patent No.: US 10,768,366 B2
(45) Date of Patent: Sep. 8, 2020

(54) ADIABATIC POLARIZATION ROTATOR COMBINER

(71) Applicant: FINISAR CORPORATION, Sunnyvale, CA (US)

(72) Inventors: Bryan Park, Sunnyvale, CA (US); Daniel Mahgerefteh, Los Angeles, CA (US); Zheng Yong, Toronto (CA); Joyce Kai See Poon, Ontario (CA)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/559,474

(22) Filed: Sep. 3, 2019

(65) Prior Publication Data

US 2020/0003953 A1 Jan. 2, 2020

Related U.S. Application Data

(62) Division of application No. 15/826,673, filed on Nov. 29, 2017, now Pat. No. 10,401,566.

(Continued)

(51) Int. Cl.
| | |
|---|---|
| *G02B 6/126* | (2006.01) |
| *G02B 6/12* | (2006.01) |
| *G02B 6/122* | (2006.01) |
| *G02B 6/125* | (2006.01) |
| *G02B 6/27* | (2006.01) |
| *G02B 6/293* | (2006.01) |
| *G02B 6/14* | (2006.01) |

(52) U.S. Cl.
CPC ............ *G02B 6/126* (2013.01); *G02B 6/125* (2013.01); *G02B 6/12007* (2013.01); *G02B 6/1228* (2013.01); *G02B 6/2726* (2013.01); *G02B 6/2766* (2013.01); *G02B 6/2773* (2013.01); *G02B 6/29352* (2013.01); *G02B 6/14* (2013.01); *G02B 2006/1215* (2013.01); *G02B 2006/12035* (2013.01); *G02B 2006/12061* (2013.01); *G02B 2006/12097* (2013.01); *G02B 2006/12119* (2013.01); *G02B 2006/12152* (2013.01)

(58) Field of Classification Search
None
See application file for complete search history.

(56) References Cited

U.S. PATENT DOCUMENTS

| | | | |
|---|---|---|---|
| 2015/0338577 A1* | 11/2015 | Shi ..................... | G02B 6/126 385/11 |
| 2016/0246005 A1* | 8/2016 | Liu ..................... | G02B 6/2766 |
| 2017/0075063 A1* | 3/2017 | Brouckaert ............ | G02B 6/126 |

* cited by examiner

*Primary Examiner* — Chad H Smith
(74) *Attorney, Agent, or Firm* — Maschoff Brennan (57) ABSTRACT

A system may include a polarization rotator combiner. The polarization rotator combiner may include a first stage, a second stage, and a third stage. The first stage may receive a first component of light with a TE00 polarization and a second component of light with the TE00 polarization. The first stage may draw optical paths of the first and second components together. The second stage may receive the first component and the second component from the first stage. The second stage may convert the polarization of the second component from the TE00 polarization to a TE01 polarization. The third stage may receive the first component and the second component from the second stage. The third stage may convert polarization of the second component from the TE01 polarization to a TM00 polarization. The third stage may output the first component and output the second component.

7 Claims, 6 Drawing Sheets

Related U.S. Application Data

(60) Provisional application No. 62/427,672, filed on Nov. 29, 2016.

ADIABATIC POLARIZATION ROTATOR COMBINER

CROSS-REFERENCE TO RELATED APPLICATION

This application is a divisional application of U.S. patent application Ser. No. 15/826,673, filed Nov. 29, 2017, which claims the benefit of and priority to U.S. Provisional App. No. 62/427,672, filed Nov. 29, 2016 (hereinafter the '672 application), which is incorporated herein by reference. This application is also related to U.S. application Ser. No. 15/826,636, filed Nov. 29, 2017 (hereinafter the '636 application), which is incorporated herein by reference.

FIELD

The embodiments discussed herein are related to adiabatic polarization rotators and/or combiners.

BACKGROUND

Unless otherwise indicated herein, the materials described herein are not prior art to the claims in the present application and are not admitted to be prior art by inclusion in this section.

U.S. Pat. Pub. 2016/0131842 A1 (hereinafter the '842 publication), which is incorporated herein by reference, discloses two-stage adiabatically coupled photonic systems that may adiabatically couple light from an interposer waveguide to a silicon nitride (SiN) waveguide with a tapered end and from the SiN waveguide to a silicon (Si) waveguide with a tapered end. Alternatively, light can be adiabatically coupled in the opposite direction, e.g., from the Si waveguide to the SiN waveguide to the interposer waveguide. The SiN waveguide and the Si waveguide may be implemented in a Si photonic integrated circuit (PIC). The '842 publication additionally discloses, among other things, a polarization rotator that may be formed in the Si PIC.

The claimed subject matter is not limited to configurations that solve any disadvantages or that operate only in environments such as those described above. This background is only provided to illustrate examples of where the present disclosure may be utilized.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments described herein generally relate to adiabatic polarization rotators and/or combiners.

A system may include a polarization rotator combiner (PRC). The PRC may include a first stage, a second stage, and a third stage. The first stage may be configured to receive a first component of light with a TE00 polarization in a first input of the PRC and receive a second component of light with the TE00 polarization in a second input of the PRC. The first stage may also be configured to spatially combine the first component and the second component. The first stage may be configured to output the first component with the TE00 polarization via a first intermediate output. The first stage may also be configured to output the second component with the TE00 polarization via a second intermediate output different than the first intermediate output. The second stage be configured to receive from the first stage the first component with the TE00 polarization and the second component with the TE00 polarization. The second stage may also be configured to convert the polarization of the second component from the TE00 polarization to a TE01 polarization. The second stage may be configured to output the first component with the TE00 polarization and the second component with the TE01 polarization. The third stage may be configured to receive from the second stage the first component with the TE00 polarization and the second component with the TE01 polarization. The third stage may also be configured to convert polarization of the second component from the TE01 polarization to a TM00 polarization. The third stage may also be configured to output the first component with the TE00 polarization and output the second component with the TM00 polarization from an output of the PRC.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

DETAILED DESCRIPTION OF SOME EXAMPLE EMBODIMENTS

Embodiments disclosed herein relate to polarization combiners (PC) and/or polarization rotator combiners (PRC) that can be implemented in systems such as described in the '842 publication, e.g., together with and/or in place of the polarization rotator disclosed in the '842 publication.

For example, multiple components of light may be received from two interposer waveguides into two input waveguides of a PRC. Alternatively or additionally, the multiple components of light may be received from multiple multiplexers. The multiple components of light may comprise different wavelength channels. The multiple components of light may then be polarization combined and/or rotated as described herein to spatially combine the multiple components of light from two different optical paths onto a common optical path output from the PRC. The multiple components on the common optical path may be adiabatically coupled from an output waveguide with a tapered end to an interposer waveguide as disclosed in the '842 publication. The multiple components on the common optical path may be provided to other components in the Si PIC.

Figure 1A:
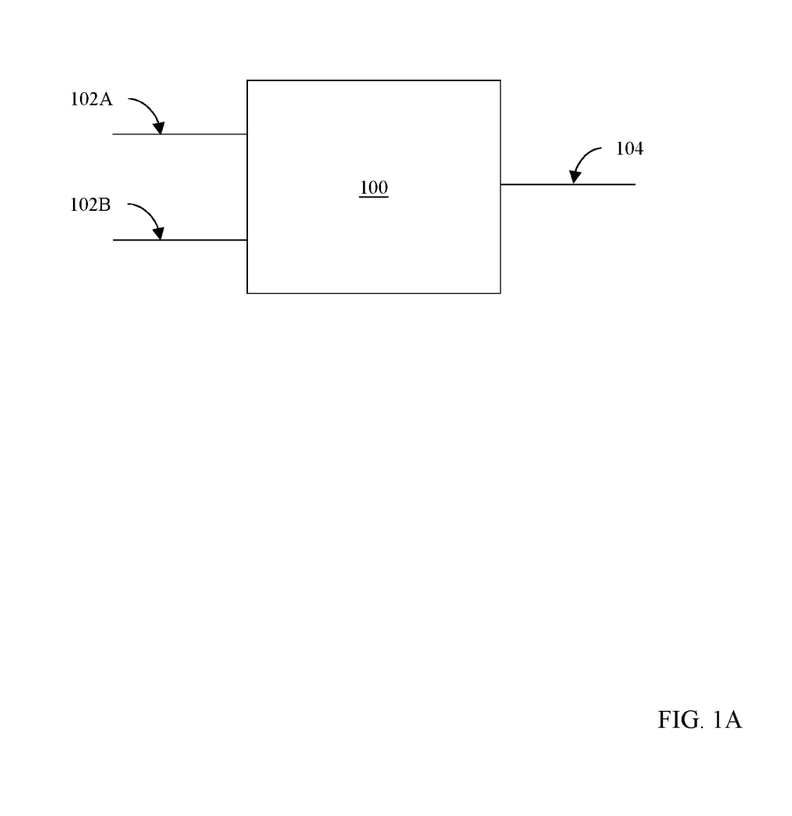
FIG. 1A is an example polarization rotator combiner.

FIG. 1A illustrates an example PRC 100 that includes two inputs 102A and 102B (generically "inputs 102" or specifically "input A 102A" or "input B 102B") and a single output 104, arranged in accordance with at least one embodiment described herein. Each of the inputs 102 and the output 104 may in some embodiments include a SiN waveguide, e.g., a SiN waveguide core surrounded by a suitable cladding. The inputs 102 may receive an incoming light signal with a single polarization, for example the transverse electric (TE) polarization or the transverse magnetic (TM) polarization. The incoming polarized light signal may include one or more distinct wavelength channels. In an example embodiment, the PRC 100 is configured to receive a first component of light, e.g., one or more first wavelength channels, with TE polarization on input A 102A, receive a second component of light, e.g., one or more second wavelength channels, with TE polarization on input B 102B, rotate or convert polarization of the second component from TE to TM polarization, combine the first component and the second component into a light signal with two components with orthogonal polarization, and output the combined light signal on output 104. The output 104 may include the common optical path onto which the two different components of light are spatially combined from two different optical paths. In some embodiments, the PRC 100 may be configured to receive light with a wavelength in the range of 1260-1340 nanometers (nm) or in some other wavelength range.

Figure 1B:
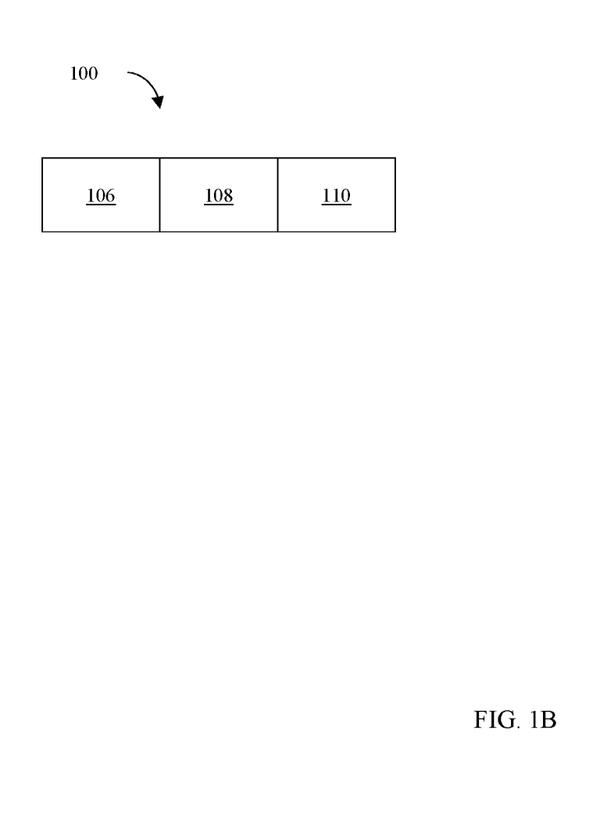
FIG. 1B is another example polarization rotator combiner.

FIG. 1B is a block diagram of an example implementation of the PRC 100 of FIG. 1A, arranged in accordance with at least one embodiment described herein. As illustrated in FIG. 1B, the PRC 100 may generally include a first stage 106, a second stage 108, and a third stage 110. In an example embodiment, the first stage 106 may be configured to draw closer together optical paths of the first and second components of light that enter in two inputs of the first stage 106. Each of the first and second components may have the same polarization, such as TE00 polarization. The second stage 108 may be configured to convert polarization of the second component of the incoming light signal from the TE00 polarization mode to a TE01 polarization mode and to combine the first and second components onto a common optical path. The third stage may be configured to convert the polarization of the second component from the TE01 polarization to a TM00 polarization before outputting the first and second components on the common optical path, the first with the TE00 polarization and the second with the TM00 polarization, from the PRC 100. The first component may include a first wavelength channel while the second component may include a second channel. By outputting the two components on different wavelength channels and different polarization channels, the multiplexing operation performed by the PRC 100 may subject the two components to less loss than other multiplexers.

Embodiments described herein include various embodiments of the PRC 100 that may be implemented in a Si PIC such as described in the '842 publication. In these and other embodiments, vertical asymmetry of a propagation path that includes one or more waveguides may be leveraged to convert polarizations and/or separate components of an incoming light signal. An embodiment specifically disclosed herein include a first PRC with a rib SiN waveguide. Various polarization rotator-splitters (PRSs) disclosed in the '672 application and/or the '636 application) may be operated in reverse as a PRC in the embodiments described herein.

Figure 2:
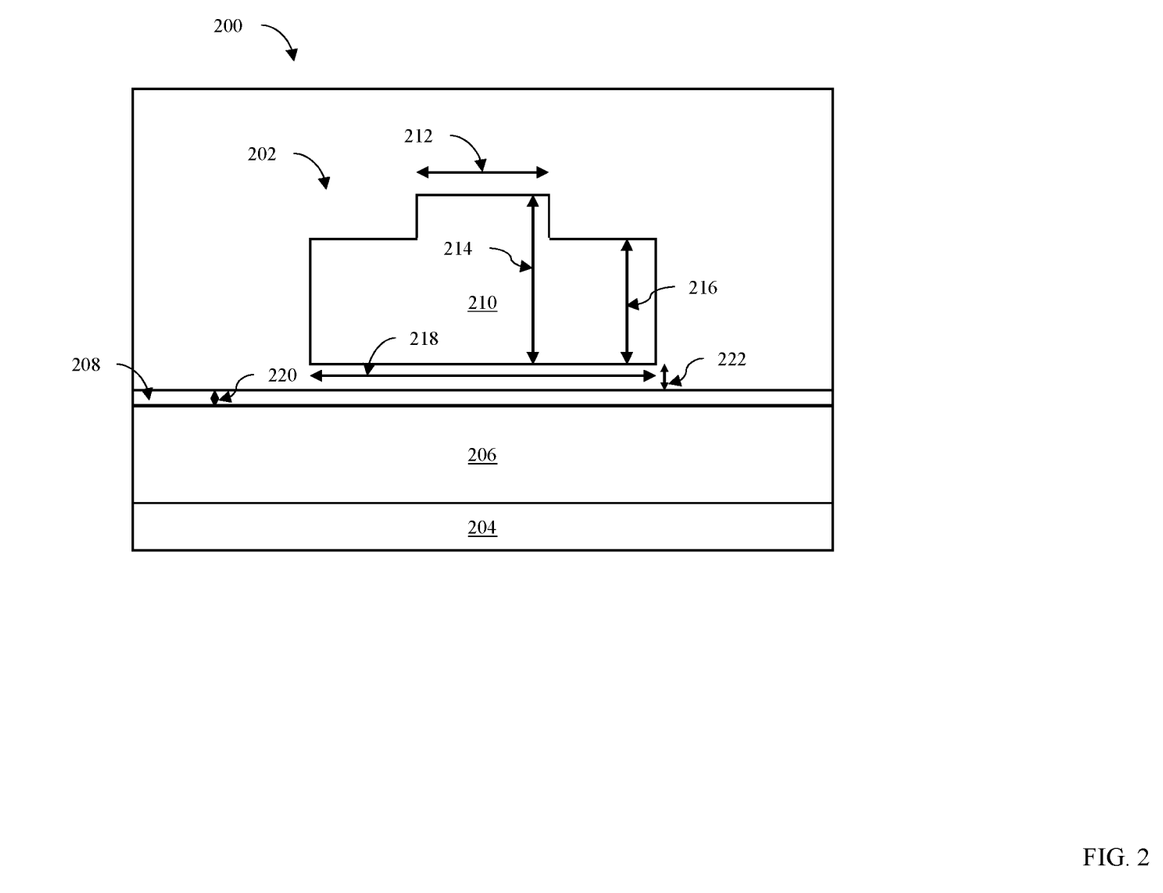
FIG. 2 is an example of a silicon photonic integrated circuit.

FIG. 2 is a cross-sectional view of a portion of a Si PIC 200 with a PRC 202, arranged in accordance with at least one embodiment described herein. The PRC 202 may include or correspond to the PRC 100 of FIGS. 1A and 1B. The Si PIC 200 may include a Si substrate 204, a buried oxide (BOX) layer 206 that may include silicon dioxide ($SiO_2$) or other suitable oxide, a SiN slab layer 208, and a SiN layer (not labeled) that includes the PRC 202. The Si PIC 200 may include one or more other layers, components, materials, etc. as disclosed in the '842 publication.

The PRC 202 includes a SiN waveguide that is ribbed along at least a portion of its length. The SiN waveguide includes a SiN waveguide core 210 together with surrounding cladding, which may include $SiO_2$ or other suitable cladding.

Various example dimensions for a similarly structured Si PIC and PRS are disclosed in the '672 and '636 applications. The same, similar, or different dimensions may be implemented for the Si PIC 200 and the PRC 202 illustrated in FIG. 2. For reference in the discussion that follows, The SiN waveguide core 210 may include a rib width $w_{rib}$ 218 which may be constant or variable along a length of the SiN waveguide core 210, a top width $w_{SiN}$ 212, e.g., of a ridge of the SiN waveguide core 210 that extends vertically above the rib of the SiN waveguide core 210 and which may be constant or variable along a length of the SiN waveguide core 210, a rib height $h_{rib}$ 216 of the SiN waveguide core 210, and a total height $h_{SiN}$ 214 of the SiN waveguide core 210.

Mode hybridization may occur when vertically asymmetric structural geometry (e.g., of the SiN waveguide core 210) changes (e.g., $w_{rib}$ widens) and such change leads to the effective indexes of two different polarization modes crossing each other. Light in one polarization mode can switch to another polarization mode after the mode hybridization if the structural change is gradual and therefore the transition process is adiabatic (i.e., mode 2 remains as mode 2, and mode 3 remains as mode 3). Additional details regarding mode hybridization according to some embodiments are described in the '672 and '636 applications.

Figure 3:
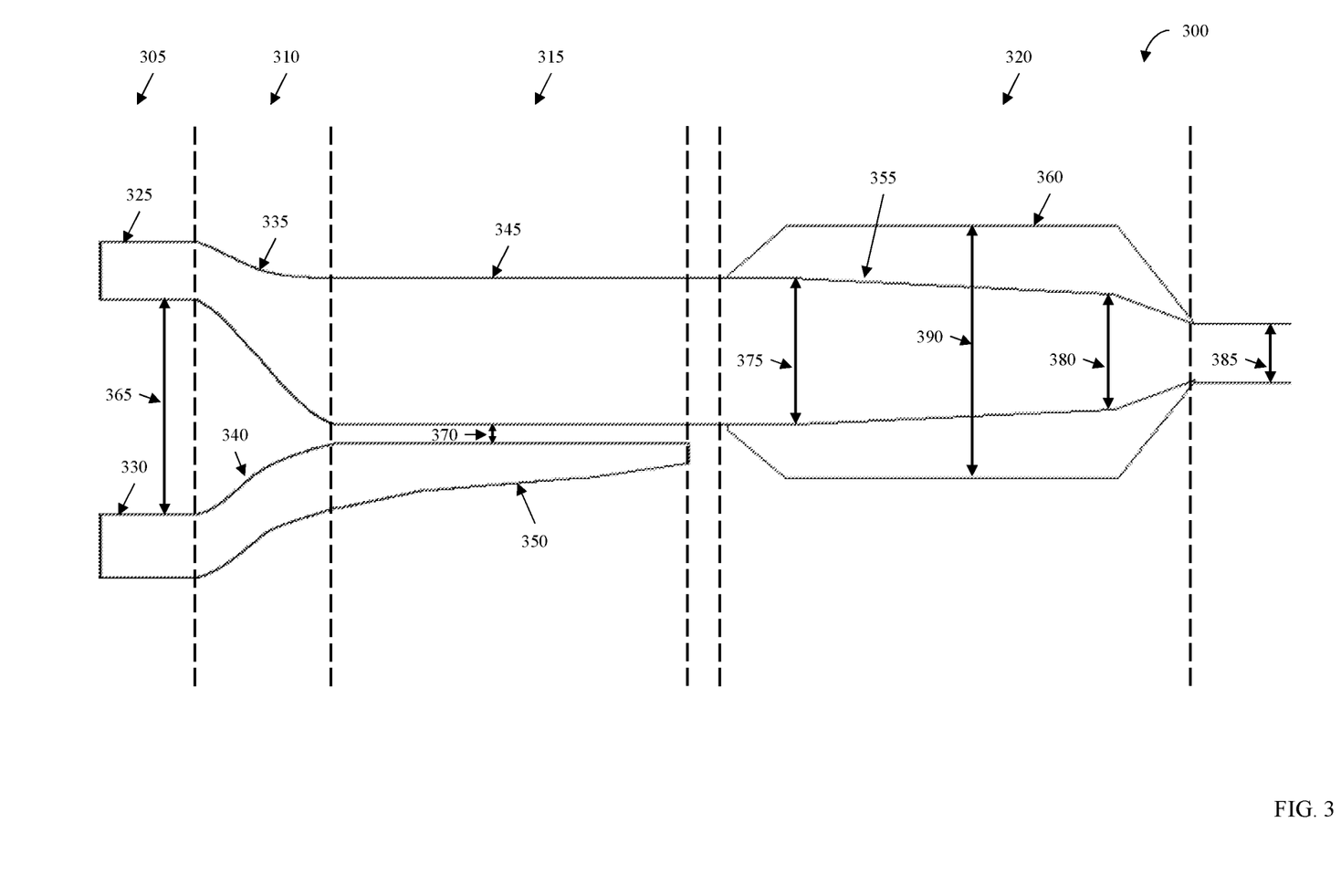
FIG. 3 is an example polarization rotator combiner.

FIG. 3 illustrates an example PRC 300, arranged in accordance with at least one embodiment described herein. The PRC 300 may include or correspond to the PRC 100 of FIG. 1A. In particular, the PRC 300 illustrates a PRC with four stages, a first stage 305, a second stage 310, a third stage 315, and a fourth stage 320. FIG. 3 illustrates an overhead view of a waveguide core of the PRC 300, which waveguide core may be surrounded by cladding (not illustrated in FIG. 3).

The first stage 305 of the PRC 300 may include a first SiN waveguide 325 and a second SiN waveguide 330. The first SiN waveguide 325 and the second SiN waveguide 330 may be configured to receive components of light which may include different wavelength channels. For example, the first stage 305 may receive components of light with wavelengths between 1,260 nm and 1,340 nm. The first SiN waveguide 325 may receive a first component of light with the TE00 polarization and a first wavelength channel and the second SiN waveguide 330 may receive a second component of light with the TE00 polarization and a second wavelength channel different than the first wavelength channel. For example, in some embodiments, the first SiN waveguide 325 and the second SiN waveguide 330 may be configured to receive components of light from a multiplexer. For example, each of the first SiN waveguide 325 and the second SiN waveguide 330 may be coupled with a different Si waveguide. For example, a first multiplexer may be coupled with a first Si waveguide, which may be coupled with the first SiN waveguide 325. A second multiplexer may be coupled with a second Si waveguide, which may be coupled with the second SiN waveguide 330. The first SiN waveguide 325 and the second SiN waveguide 330 may be separated by a distance 365. In some embodiments, the distance 365 may be 10 µm or greater. The couplings between the first and second SiN waveguides 325, 330 and the corresponding Si waveguides may include adiabatic couplings as described in the '842 publication.

The first stage 305 may be coupled with the second stage 310. For example, the first SiN waveguide 325 may be coupled and/or continuous with a first SiN S-bend waveguide 335. Similarly, the second SiN waveguide 330 may be coupled and/or continuous with a second SiN S-bend waveguide 340. In some embodiments, the first SiN S-bend waveguide 335 and the second SiN S-bend waveguide 340 may be configured to bring the first component of light received by the first SiN waveguide 325 and the second component of light received by the second SiN waveguide 330 into proximity with each other, drawing their optical paths closer together. One or both of the first stage 305 and the second stage 310 may include or correspond to the first stage 106 of the PRC 100 of FIG. 1B.

The second stage 310 may be coupled with the third stage 315. For example, the first SiN S-bend waveguide 335 may be continuous with a first SiN strip waveguide 345. Similarly, the second SiN S-bend waveguide 340 may be continuous with a second SiN strip waveguide 350. The example third stage 315 may include or correspond to the second stage 108 of the PRC 100 of FIG. 1B. The first SiN strip waveguide 345 and the second SiN strip waveguide 350 may include waveguide cores (as illustrated in FIG. 3) surrounded by cladding (not illustrated in FIG. 3). The first SiN strip waveguide 345 may have a constant width 375 in the third stage 315. The width 375 may be 3 µm. The first SiN strip waveguide 345 and the second SiN strip waveguide 350 may be separated by a gap width $w_{gap}$ 370. The gap width $w_{gap}$ 370 may be constant along the length of the third stage 315 and may be a distance of 400 nm or less. The second SiN strip waveguide 350 may taper from an initial width where the second SiN strip waveguide 350 is continuous with the second SiN S-bend waveguide 340 to a narrower width at the end of the second SiN strip waveguide 350. The second SiN strip waveguide 350 is illustrated as tapering inwardly in the propagation direction (e.g., from left to right in FIG. 3) along the length of the second SiN strip waveguide 350. The taper shape of the second SiN strip waveguide 350 may be linear, exponential, or another shape. The first SiN strip waveguide 345 may continue to the fourth stage 320. In comparison, the second SiN strip waveguide 350 may not continue to the fourth stage 320 and may end in the third stage 315.

The third stage 315 may function as a polarization combiner. The first component of light in the TE00 polarization mode may propagate in the first SiN strip waveguide 345 and may exit the first SiN strip waveguide 345 with the TE00 polarization. The first SiN waveguide 325 may be referred to as the TE port since the first component of light that entered the first SiN waveguide 325 with the TE00 polarization mode exits through the first SiN strip waveguide 345 with the TE00 polarization.

The second component of light in the TE00 polarization mode that enters the second SiN waveguide 330 and propagates in the second SiN strip waveguide 350 may be shifted to the first SiN strip waveguide 345 and may be converted to the TE01 polarization mode and propagate in the first SiN strip waveguide 345 after the third stage 315. In particular, the second component of light with TE00 polarization that enters the second SiN strip waveguide 350 (e.g., from the second stage 310 via the first stage 305) of the second stage 315 evolves into TE01 polarization and shifts to the first SiN strip waveguide 345. The changing geometry of the second SiN strip waveguide 350 (e.g., the inward taper) may cause the second SiN strip waveguide 350 to no longer support the TE00 polarization mode somewhere along the length of the second SiN strip waveguide 350. In particular, at some point along the length of the second SiN strip waveguide 350 effective indices of TE00 in the second SiN strip waveguide 350 and of TE01 in the first SiN strip waveguide 345 cross and it becomes more favorable for the second component of light to be in the TE01 polarization mode in the first SiN strip waveguide 345.

The third stage 315 may be coupled with the fourth stage 320. The fourth stage 320 may include or correspond to the third stage 110 of the PRC 100 of FIG. 1B. The fourth stage 320 may be surrounded by cladding (not illustrated in FIG. 3). The first SiN strip waveguide 345 may be continuous with a SiN rib waveguide including a rib 360 and a top or ridge 355. Following the first SiN strip waveguide 345, the rib 360 is formed in the SiN rib waveguide that tapers outward relatively quickly over a first length of the rib 360 from a rib width 375 to a rib width 390. The rib 360 may include a constant width over a second length of the rib 360. The rib 360 may taper inward relatively quickly over a third length of the rib 360 from the rib width 390 to a strip width 385. The tapering of the rib 360 outward over the first length, the constant width of the rib 360 over the second length, and the tapering of the rib 360 inward over the third length may ensure an adiabatic transition around the hybridization point. Thus, the width of the rib 360 may vary over the length of the rib 360 in the fourth stage 320. For example, the rib 360 may expand from a width of 3 µm to a width of 4.2 µm over the first length of the rib 360. The rib 360 may have a constant width of 4.2 µm over the second length of the rib 360. The rib 360 may then taper to a width of 700 nm over the third length of the rib 360.

The top 355 may have a top width $w_{SiN}$. $w_{SiN}$ may be a constant width of the width 375 over a first length of the top 355. The top width $w_{SiN}$ of the top 355 may taper inward relatively slowly over a second length of the top 355 from the width 375 to the intermediate top width 380. The top width $w_{SiN}$ of the top 355 may taper inward relatively quickly over a third length of the top 355 from the intermediate top width 380 to the strip width 385. For example, in some embodiments, the top width $w_{SiN}$ of the top 355 may be 3 µm over the first length. The top width $w_{SiN}$ of the top 355 may taper slowly inward from 3 µm to 2 µm over the second length. The top width $w_{SiN}$ of the top 355 may taper from 2 µm to 700 nm over the third length.

The fourth stage 320 of the PRC 300 may facilitate the evolution of the second component with the TE01 polarization mode to the TM00 polarization mode. In particular, the second component of light with the TE01 polarization mode that enters the fourth stage 320 may evolve into the TM00 polarization by the time the second component exits the fourth stage 320. In some embodiments, conversion efficiency of TE01 to TM00 generally improves as the length of the fourth stage 320 increases. Thus, the fourth stage 320 may convert TE01 to TM00, e.g., for the second component, and TE00 may remain as TE00, e.g., for the first component. In particular, at an input end of the fourth stage 320 where the waveguide has the ribbed cross-sectional shape corresponding to a rib waveguide, the fourth stage 320 supports the TE00, TE01, and TM00 polarization modes. At an output end of the fourth stage 320 when the fourth stage 320 core has a rectangular cross section corresponding to a strip waveguide, the fourth stage 320 supports the TE00 and TM00 polarization modes. Any TE00 polarized light that enters at the input end will exit at the output end with the same TE00 polarization since the TE00 polarization mode does not hybridize with any other polarization modes for the depicted configuration of the waveguide. In comparison, any TE01 polarized light that enters at the input end is converted to, or evolves into, TM00 polarized light since the TM00 polarization mode is more favorable than the TE01 polarization mode where the TM00 and TE01 polarization modes hybridize. In particular, the second component of light with the TE01 polarization that enters the fourth stage 320 evolves into TM00 polarization by the exit from the fourth stage 320. Generally, conversion efficiency of TE01 to TM00 increases with increasing length of the fourth stage 320. Accordingly, the second SiN waveguide 330 may be referred to as the TM port since the second component of light that enters the second SiN waveguide 330 with the TE00 polarization mode exits through the first SiN strip waveguide 345 with the TM00 polarization.

In some embodiments, the output end of the fourth stage 320 may include a SiN strip waveguide with a rectangular or square cross section. The fourth stage 320 may be coupled to or continuous with a SiN strip waveguide. The SiN strip waveguide may be optically coupled to an optical fiber through an output of the SiN strip waveguide.

Thus, the TE00 polarization remains as the TE00 polarization mode in the PRC 300 when entering through the TE port or the first SiN waveguide 325. The first component of light that enters the first SiN waveguide 325 of the first stage 305 with the TE00 polarization mode maintains the TE00 polarization mode throughout the PRC 305. In addition, the TE00 polarization mode also evolves to the TM00 polarization mode in the PRC 300 when entering through the TM port or the second SiN waveguide 330. The second component of light that enters the second SiN waveguide 330 of the first stage 305 with the TE00 polarization mode is converted to the TE01 polarization mode within the third stage 315 and combined with the first component of light with the TE00 polarization mode from the first SiN waveguide 325. The second component of light is then converted from the TE01 polarization mode to the TM00 polarization mode within the fourth stage 320. The combined light with the first component with the TE00 polarization mode and the second component with the TM00 polarization modes exits the PRC 300 from the output of the fourth stage 320.

Figure 4:
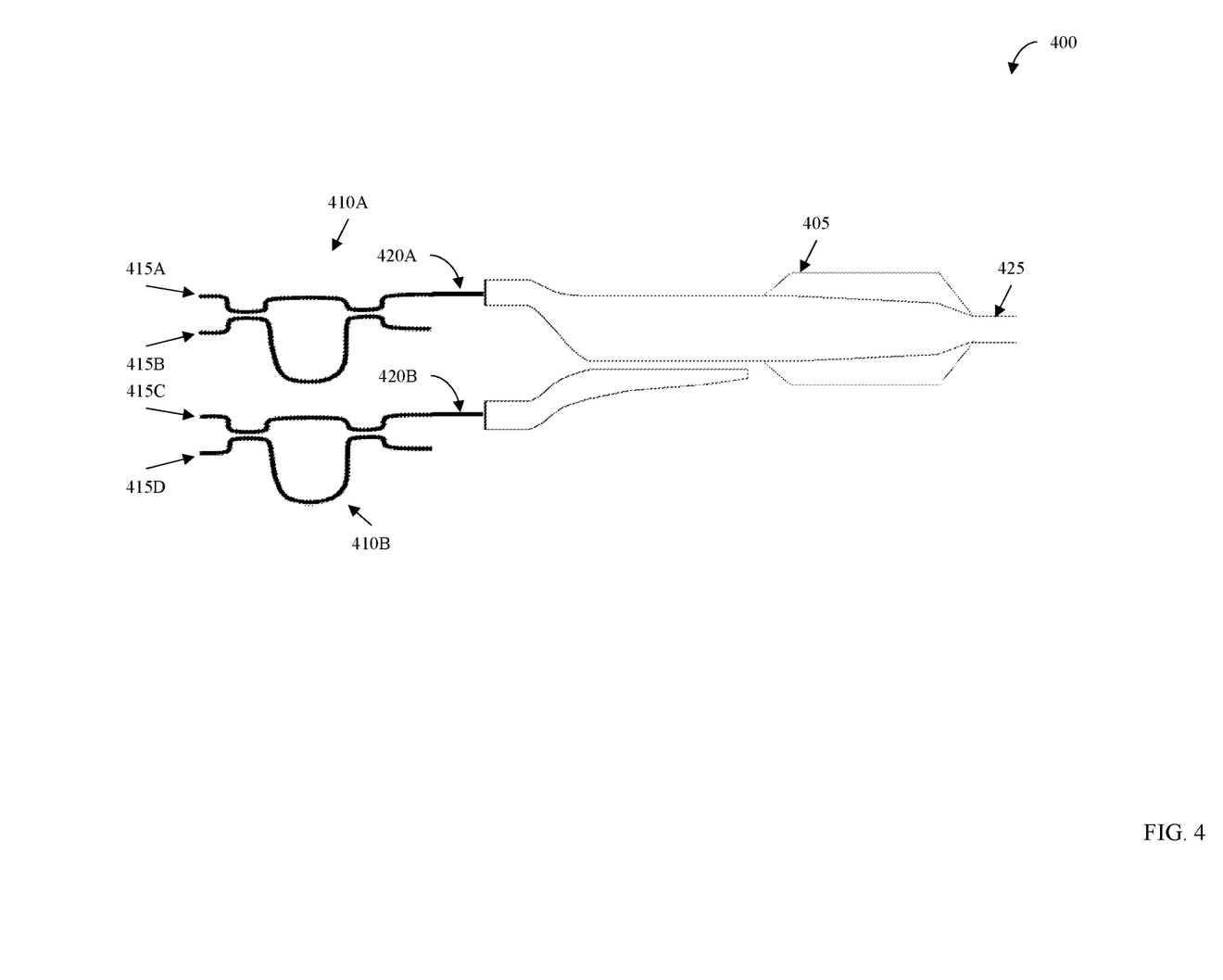
FIG. 4 is an example system including a polarization rotator combiner.

FIG. 4 illustrates an example system 400 including a PRC 405 and two multiplexers 410A and 410B (generically "multiplexers 410" or specifically "multiplexer A 410A" or "multiplexer B 410B"), arranged in accordance with at least one embodiment described herein. The PRC 405 may be similar or identical to the PRC 300 discussed above with reference to FIG. 3 and/or may include one of the PRSs disclosed in the '672 and '636 applications operated in reverse.

Each of the multiplexers 410 may include multiple multiplexer inputs, such as the multiplexer inputs 415A and 415B of multiplexer A 410A and the multiplexer inputs 415C and 415D of multiplexer B 410B (generically "multiplexer inputs 415" or specifically "multiplexer input A 415A," "multiplexer input B 415B," "multiplexer input C 415C," or "multiplexer input D 415D"). The multiplexer inputs 415 may be configured to receive optical signals with the TE polarization on different wavelength channels. For example, the multiplexer input A 415A may receive an optical signal with a first wavelength $\lambda_1$ and with the TE00 polarization. The multiplexer input B 415B may receive an optical signal with a second wavelength $\lambda_2$ and with the TE00 polarization. Similarly, the multiplexer input C 415C may receive an optical signal with a third wavelength $\lambda_3$ and with the TE00 polarization and the multiplexer input D 415D may receive an optical signal with a fourth wavelength $\lambda_4$ and with the TE00 polarization. In some embodiments, the multiplexers 410 may include Mach Zehnder Delay Line Interferometers (MZDLI) and may be configured to combine the optical signals at the first wavelength and the second wavelength to generate a combined signal with the TE00 polarization. For example, the multiplexer A 410A may be configured to generate a combined signal from the multiplexer inputs 415A and 415B with wavelengths $\lambda_1$ and $\lambda_2$ as the multiplexer output A 420A with a combined wavelength $\lambda_1$, $\lambda_2$ and the TE00 polarization. The multiplexer B 410B may be configured to generate a combined signal from the multiplexer inputs 415C and 415D with wavelengths $\lambda_3$ and $\lambda_4$ as the multiplexer output B 420B with a combined wavelength $\lambda_3$, $\lambda_4$ and the TE00 polarization. In some embodiments, the multiplexers 410 may be made of silicon (Si). The wavelengths $\lambda_1$ through $\lambda_4$ may be or include different wavelength channels.

The multiplexer outputs 420A and 420B may be the inputs to the PRC 405. As described above with respect to FIG. 3, the PRC 405 may rotate the polarization of one of the inputs to the PRC 405. For example, the PRC 405 may rotate the polarization of the multiplexer output 420B from the TE00 polarization to the TM00 polarization. The PRC 405 may additionally combine the inputs to the PRC 405 into a signal output 425. The signal output 425 may include components with a combined wavelength $\lambda_1$, $\lambda_2$ and the TE00 polarization and with a combined wavelength $\lambda_3$, $\lambda_4$ and the TM00 polarization. The signal output 425 of the PRC 405 may be coupled with an optical fiber or other optical device. For example, the signal output 425 may be coupled into an optical fiber using adiabatic coupling to a polymer, glass, or other interposer.

Figure 5A:
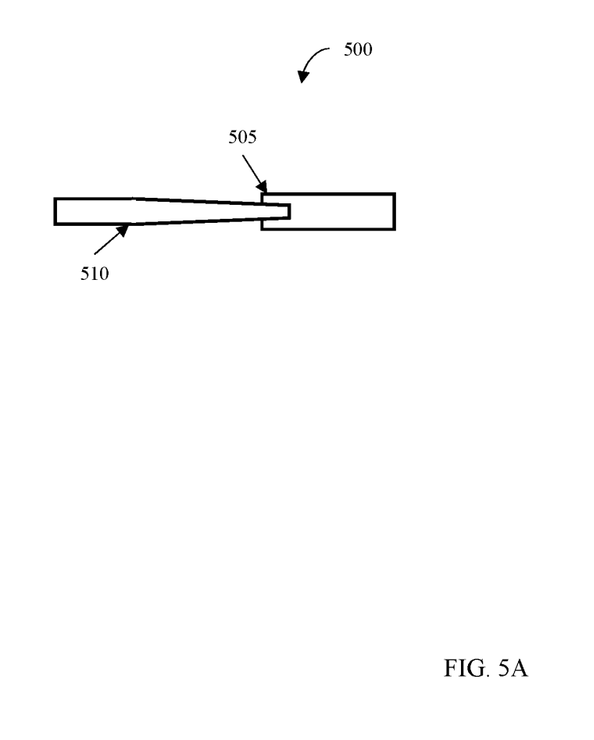
FIG. 5A is a bottom view of a silicon waveguide/silicon nitride waveguide coupling.

FIG. 5A illustrates a bottom view 500 of an example coupling between a Si taper 510 and a SiN waveguide 505 of a PRC. In some embodiments, the Si taper 510 may be coupled with the output of a multiplexer, such as the MZDLI multiplexer 410A or 410B of FIG. 4. For example, in some embodiments, a MZDLI multiplexer may be coupled with or include the Si taper 510 and the SiN waveguide 505 may correspond to the first SiN waveguide 325 of FIG. 3. In some embodiments, the Si taper 510 may be positioned above or below the SiN waveguide 505. Light may be adiabatically coupled from the Si taper 510 to the SiN waveguide 505 as described in the '842 publication assuming the Si taper 510 and the SiN waveguide 505 are configured as described in the '842 publication. In some embodiments, the SiN waveguide 505 may be positioned above the Si taper 510 by 50 nm to 100 nm.

Figure 5B:
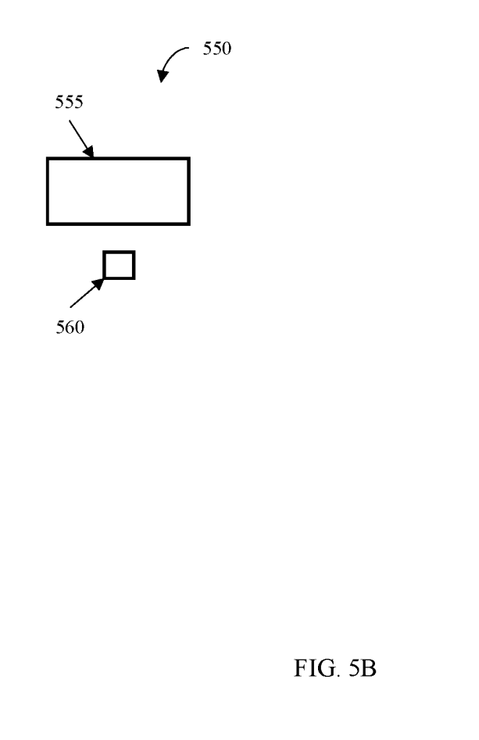
FIG. 5B is a cross-sectional view of a silicon waveguide/silicon nitride waveguide coupling.

FIG. 5B illustrates a cross-sectional view 550 of an example coupling between a Si taper 560 and a SiN waveguide 555 of a PRC. In some embodiments, FIG. 5B may represent a cross-sectional view of the coupling depicted in FIG. 5A. In some embodiments, the Si taper 560 may be coupled with the output of a multiplexer such as a MZDLI multiplexer. In some embodiments, the Si taper 560 may be positioned below the SiN waveguide 555 as illustrated in FIG. 5B, or above the SiN waveguide 555. Light may be adiabatically coupled from the Si taper 560 to the SiN waveguide 555. In some embodiments, the SiN waveguide 555 may be positioned above the Si taper 560 by 50 nm to 100 nm.

In some embodiments, the coupling efficiency between a Si taper and a SiN waveguide coupling as depicted in FIGS. 5A and 5B may be relatively high as described in the '842 publication.

Figure 6:
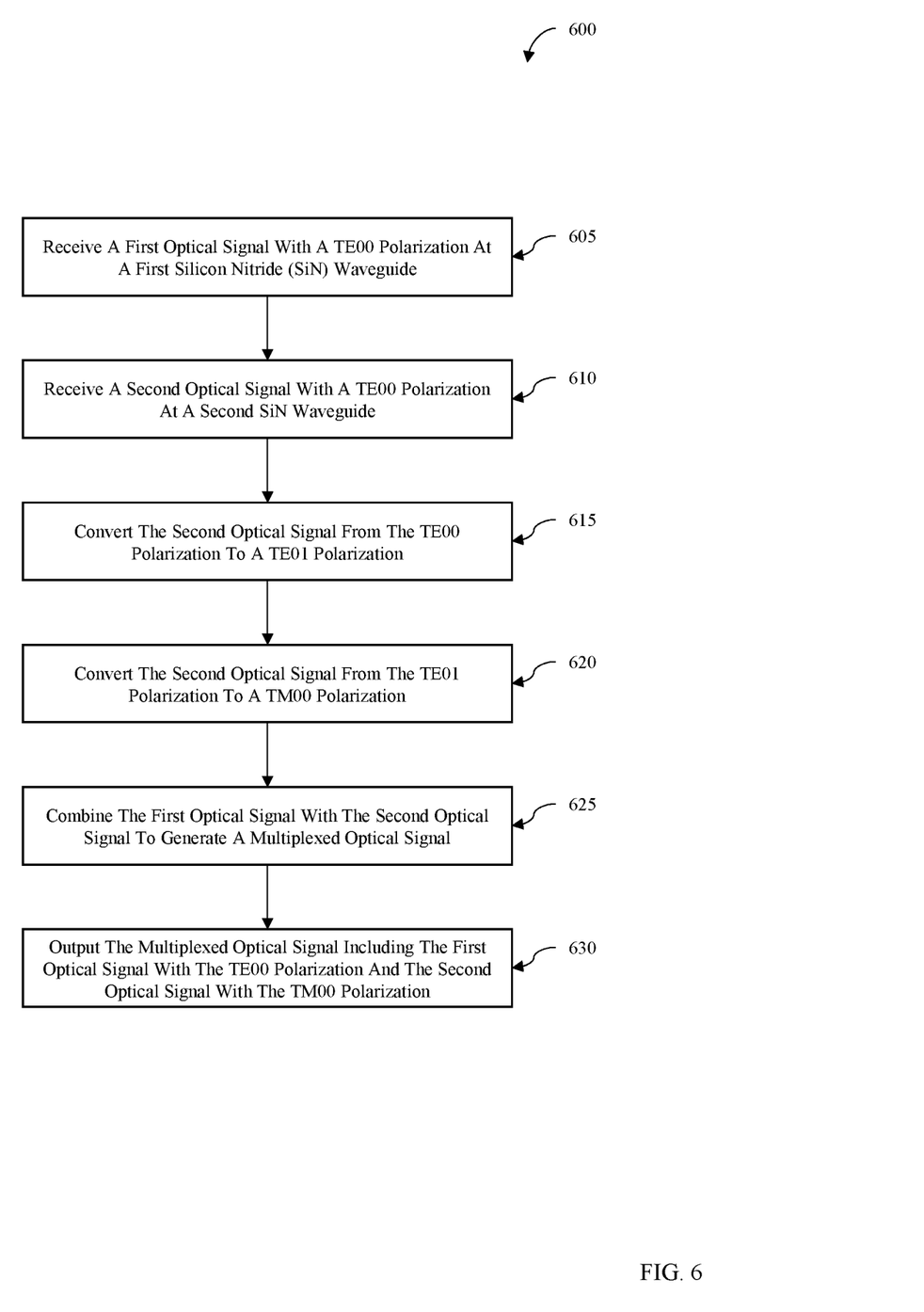
FIG. 6 is a flowchart of an example method of rotating polarization and combining components of light.

FIG. 6 is a flowchart of an example method of rotating polarization and combining components of light. The method 600 may be arranged in accordance with at least one embodiment described in the present disclosure. The method 600 may be performed, in whole or in part, in some embodiments by a system and/or environment, such as the PRC 100, the PRC 300, and/or the system 400 of FIGS. 1, 3, and 4, respectively. Although illustrated as discrete blocks, various blocks may be divided into additional blocks, combined into fewer blocks, or eliminated, depending on the desired implementation.

The method 600 may begin at block 605, where a first optical signal with a TE00 polarization may be received at a first silicon nitride (SiN) waveguide of a PRC, such as the PRC 300 and/or 405. In block 610, a second optical signal with a TE00 polarization may be received at a second SiN waveguide of the PRC. In some embodiments, the first optical signal and the second optical signal may each include at least one wavelength channel. Each wavelength channel may be centered at a center wavelength in a range from 1,260 to 1,350 nm. The wavelength channels may be different from each other. In some embodiments, the first optical signal may include a first input multiplexed signal with first and second wavelength channels and the second optical signal may include a second input multiplexed signal with third and fourth wavelength channels.

In block 615, the second optical signal may be converted from the TE00 polarization to a TE01 polarization. In block 620, the second optical signal may be converted from the TE01 polarization to a TM00 polarization.

In block 625, the first optical signal with the TE00 polarization may be spatially combined with the second optical signal with the TM00 polarization to generate a multiplexed optical signal. In block 630, the multiplexed optical signal including the first optical signal with the TE00 polarization and the second optical signal with the TM00 polarization may be output from the PRC.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising a polarization rotator combiner (PRC) that includes:
   a first stage configured to:
   receive a first component of light with a TE00 polarization in a first input of the PRC and receive a second component of light with the TE00 polarization in a second input of the PRC;
   output the first component with the TE00 polarization via a first intermediate output; and
   output the second component with the TE00 polarization via a second intermediate output different than the first intermediate output, wherein a distance between the first and second intermediate output is less than a distance between the first and second input;
   a second stage configured to:
   receive from the first stage the first component with the TE00 polarization and the second component with the TE00 polarization;
   convert the polarization of the second component from the TE00 polarization to a TE01 polarization; and
   output the first component with the TE00 polarization and the second component with the TE01 polarization;
   a third stage configured to:
   receive from the second stage the first component with the TE00 polarization and the second component with the TE01 polarization;
   convert polarization of the second component from the TE01 polarization to a TM00 polarization; and
   output the first component with the TE00 polarization and output the second component with the TM00 polarization from an output of the PRC;
   a waveguide core that includes a first ridge that extends above a rib through each of the first, second, and third stages.

2. The system of claim 1, wherein the first component and the second component include light with a wavelength between 1,260 nanometers (nm) and 1,340 nm.

3. The system of claim 1, wherein the first component includes a first combined component with first and second wavelength channels and the second component includes a second combined component with third and fourth wavelength channels.

4. The system of claim 1, further comprising an optical fiber optically coupled to the third stage of the PRC through the output of the PRC.

5. The system of claim 1, wherein the waveguide core includes the rib in each of the first, second, and third stages.

6. The system of claim 5, wherein the waveguide core further comprises:
   a second ridge that extends above the rib and that extends through each of the first and second stages, the second ridge laterally spaced apart from the first ridge in each of the first and second stages.

7. The system of claim 1, wherein:
   the rib tapers outward for a first portion of the first stage to a first width and has the first width as a constant width for a second portion of the first stage;
   the rib has the first width as a constant width in the second stage;
   the rib tapers from the first width inward for a first portion of the third stage to a second width, has the second width as a constant width for a second portion of the third stage, and tapers from the second width inward for a third portion of the third stage.

\* \* \* \* \*